United States Patent
Shah et al.

[11] Patent Number: 6,045,602
[45] Date of Patent: Apr. 4, 2000

[54] METHOD FOR INTEGRATING A BLAST FURNACE AND A DIRECT REDUCTION REACTOR USING CRYOGENIC RECTIFICATION

[75] Inventors: Minish Mahendra Shah, East Amherst; Raymond Francis Drnevich, Clarence Center, both of N.Y.

[73] Assignee: Praxair Technology, Inc., Danbury, Conn.

[21] Appl. No.: 09/181,473

[22] Filed: Oct. 28, 1998

[51] Int. Cl.[7] ...................................................... C21B 5/00
[52] U.S. Cl. .................................. 75/466; 75/458; 75/468; 75/505
[58] Field of Search ............................... 75/458, 466, 468, 75/505

[56] References Cited

U.S. PATENT DOCUMENTS

| | | | |
|---|---|---|---|
| 4,363,654 | 12/1982 | Frederick et al. | 75/34 |
| 5,244,489 | 9/1993 | Grenier | 75/466 |
| 5,268,019 | 12/1993 | Rathbone | 75/958 |
| 5,538,534 | 7/1996 | Guillard et al. | 75/466 |
| 5,582,029 | 12/1996 | Occhialini et al. | 62/636 |
| 5,582,036 | 12/1996 | Drnevich et al. | 62/656 |
| 5,980,607 | 11/1999 | Clare et al. | 75/466 |

Primary Examiner—Melvyn Andrews
Attorney, Agent, or Firm—Stanley Ktorides

[57] ABSTRACT

A method for increasing iron production by integrating blast furnace ironmaking with direct reduction ironmaking wherein cryogenic rectification links the two systems and produces input materials for both.

10 Claims, 2 Drawing Sheets

METHOD FOR INTEGRATING A BLAST FURNACE AND A DIRECT REDUCTION REACTOR USING CRYOGENIC RECTIFICATION

TECHNICAL FIELD

The invention relates generally to both iron making and to cryogenic rectification and serves to combine these two technologies in a manner which cost effectively expands iron making operations.

BACKGROUND ART

In the operation of a blast furnace, coal and air combust and the resulting reducing gases are used to reduce iron ore to produce iron. The off gases from the blast furnace contain some heating value and are generally used as a fuel for power and steam generation. While this is an effective use for this gas, it is desirable to have a better use for this gas, especially in light of expected reductions in the cost of electricity available through the power grid.

Accordingly, it is an object of this invention to provide a method whereby the off gases from a blast furnace may be effectively employed to increase ironmaking capability at an ironmaking site.

SUMMARY OF THE INVENTION

In general the invention serves to effectively integrate a blast furnace with a direct iron reduction reactor using cryogenic rectification to effect the integration. The cryogenic rectification improves the blast furnace operation and enables off gas from the blast furnace to be used in a direct iron reduction reactor thus enhancing iron production both from the blast furnace per se, and from the integration of the blast furnace operation with the direct iron reduction reactor.

The above and other objects and advantages, which will become apparent to one skilled in the art upon a reading of this disclosure, are attained by the present invention which is:

A method for integrating a blast furnace and a direct reduction reactor using cryogenic rectification comprising:

(A) separating air in a cryogenic air separation plant by cryogenic rectification to produce oxygen;

(B) mixing oxygen from the cryogenic air separation plant with air to form blast air comprising from about 22 to 50 mole percent oxygen with the remainder comprised primarily of nitrogen;

(C) passing the blast air into a blast furnace and combusting oxygen of the blast air with hydrocarbon fuel in the blast furnace to produce blast furnace gas comprising nitrogen, carbon monoxide and hydrogen;

(D) reacting the carbon monoxide with steam to produce carbon dioxide and additional hydrogen, and removing the carbon dioxide from the blast furnace gas to produce fortified blast furnace gas comprising nitrogen and hydrogen;

(E) passing the fortified blast furnace gas into a cryogenic rectification plant and separating the fortified blast furnace gas within the cryogenic rectification plant to produce hydrogen and residual nitrogen; and (F) reacting hydrogen from the cryogenic rectification plant with iron ore in a direct reduction reactor to produce iron.

As used herein, the term "iron ore" means one or more oxides of iron such as ferric oxide and ferrous oxide.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or packing elements such as structured or random packing.

As used herein, the term "cryogenic rectification plant" means a separation plant wherein at least part of the operation of the plant is carried out at temperatures at or below 150 degrees Kelvin (K).

As used herein, the term "cryogenic air separation plant" means a cryogenic rectification plant comprising at least one column wherein air is separated to produce at least one of product oxygen and product nitrogen. D-20701

DETAILED DESCRIPTION

The invention will be described in detail with reference to the Drawings.

Figure 1:
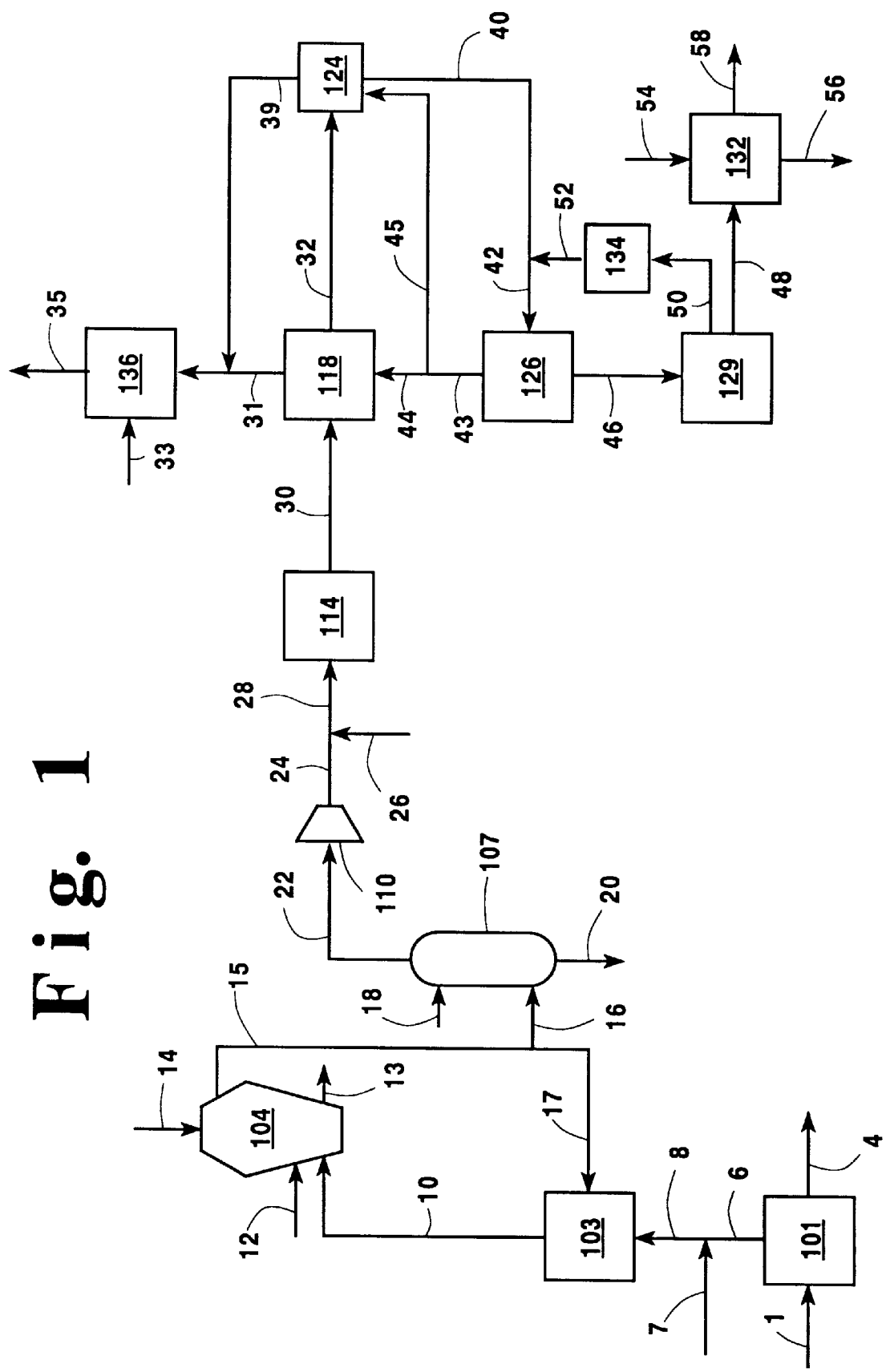
FIG. 1 is a simplified schematic block flow representation of one preferred embodiment of the method of this invention wherein carbon dioxide removal is carried out using a pressure swing adsorption unit.

Referring now to FIG. 1, feed air 1 comprised primarily of nitrogen and oxygen is passed into cryogenic air separation plant 101 wherein it is separated by cryogenic rectification to produce oxygen. Cryogenic air separation plant 101 may be any effective cryogenic air separation plant. Preferably cryogenic air separation plant 101 is a double column plant comprising a higher pressure column and a lower pressure column in heat exchange relation wherein the feed air undergoes a preliminary separation by cryogenic rectification in the higher pressure column into oxygen-enriched fluid and nitrogen-enriched fluid, and these fluids are then passed into the lower pressure column wherein they undergo a final separation by cryogenic rectification into product oxygen and product nitrogen. The cryogenic air separation plant may also employ other columns such as an argon sidearm column wherein product argon may be produced.

Nitrogen is withdrawn from cryogenic air separation plant 101 in stream 4 which may be recovered, in whole or in part, or released to the atmosphere. Product oxygen, having an oxygen concentration ranging from that of enriched air to higher purity, i.e. generally within the range of from 40 to 99.9 mole percent, is withdrawn from cryogenic air separation plant in stream 6. The oxygen from the cryogenic air separation plant is mixed with air from stream 7 to produce oxygen-enriched air or blast air 8. The blast air has an oxygen concentration generally within the range of from 22 to 50 mole percent with the remainder comprised primarily of nitrogen.

Blast air 8 is heated in stoves 103 to a temperature generally within the range of from 1500 to 2200° F. and the resulting hot blast air 10 is passed into blast furnace 104 along with hydrocarbon fuel 12 which may be coal, oil or natural gas. Also passed into blast furnace 104 is furnace charge 14 comprising iron ore, coal and flux materials. The oxygen of the blast air reacts with hydrocarbon fuel within the blast furnace generating heat and producing a reducing gas which converts the iron ore to iron as the gas flows up through the furnace. Molten iron and slag are removed from the bottom of furnace 104 in line 13 and the gas, generally termed blast furnace gas and comprising nitrogen, carbon monoxide, carbon dioxide and hydrogen, is collected in the upper portion of blast furnace 104 and withdrawn from furnace 104 is stream 15.

It is an important aspect of this invention that the blast air, while having an oxygen concentration which exceeds that of air, also contain a significant level of nitrogen, preferably of about 60 mole percent or more. This accomplishes two beneficial results. It enables the blast furnace to operate without need for significant alteration from that of conventional practice wherein air is the sole source of oxygen, and also serves as a source of nitrogen which may be beneficially employed in the downstream integration of the blast furnace operation with the direct iron reduction reactor.

Referring back now to FIG. 1, a portion 17 of blast furnace off-gas 15 is passed to stoves 103 wherein it is burned to provide heat to heat the blast air. The remaining portion 16 of blast furnace off-gas 15 is passed into the lower portion of wash tower 107. Water is passed into the upper portion of wash tower 107 in stream 18 and passes down wash tower 107 against upflowing blast furnace gas and, in the process, particulate impurities within the blast furnace gas are washed into the downflowing water and the blast furnace gas is cooled to a temperature generally within the range of from 40 to 150° F. The wash water is removed from wash tower 107 in stream 20.

Cooled blast furnace gas is withdrawn from the upper portion of wash tower 107 in stream 22 and passed to compressor 110 wherein it is compressed to a pressure generally within the range of from 100 to 500 pounds per square inch absolute (psia). The resulting pressurized blast furnace gas in stream 27 is mixed with steam at substantially the same pressure to form water gas shift reaction stream 28. The steam in stream 26 is added to the pressurized blast furnace gas stream 24 at a rate such that the ratio of water to carbon monoxide in water gas shift reaction stream 28 is within the range of from 2 to 5. Preferably, streams 24 and 26 are each heated to about 600° F. before they are mixed to form stream 28.

Water gas shift reaction stream 28 is passed into shift reaction section 114 which preferably comprises high temperature and lower temperature shift reactors in series with heat exchangers after each shift reactor. As the water gas shift reaction mixture passes through the shift reactors the carbon monoxide reacts with steam in an exothermic reaction to produce carbon dioxide and hydrogen. The resulting blast furnace gas comprising nitrogen, carbon dioxide and hydrogen is then passed in stream 30 from water gas shift reaction section 114 to pressure swing adsorption system 118 which comprises one or more beds of adsorbent particles which preferentially adsorb carbon dioxide. Among such adsorbent materials one can name activated carbon and zeolites.

As the blast furnace gas passes through pressure swing adsorption system 118, carbon dioxide is removed from the blast furnace gas by being preferentially adsorbed onto the adsorbent. The resulting fortified blast furnace gas comprising nitrogen and hydrogen is withdrawn from pressure swing adsorption system in stream 32.

Stream 32 may contain up to 300 ppm of carbon dioxide and will also contain some water. Stream 32 is passed through prepurifier 124 for the removal of the water and carbon dioxide. Resulting fortified blast furnace gas is withdrawn from prepurifier 124 in stream 40 and combined with recycle stream 52 to form stream 42 which is fed into cryogenic rectification plant 126. Preferably cryogenic rectification plant 126 comprises a heat exchanger wherein the feed is partially condensed and then phase separated to effect the separation. However, the plant could combine the heat exchange and phase separation with further column separation. Within the cryogenic rectification plant 126 the feed 42 is separated by cryogenic rectification into hydrogen-enriched fluid, having a hydrogen concentration generally within the range of from 70 to 95 mole percent, and residual nitrogen having a nitrogen concentration of about 98 mole percent with the remainder being mostly hydrogen and carbon monoxide.

Hydrogen-enriched fluid is passed from cryogenic rectification plant 126 in stream 46 to a hydrogen concentrator which, in the embodiment illustrated in FIG. 1, is a membrane separator unit 129. Within membrane unit 129 the hydrogen is concentrated to a purity generally exceeding 95 mole percent. A recycle stream containing less than 85 mole percent hydrogen and at about 200 psia is passed from membrane unit 129 in stream 50 to blower 134 and from there as the aforesaid recycle stream 52 into cryogenic rectification plant 126. The concentrated hydrogen stream is passed in stream 48 into direct reduction reactor system 132 along with iron ore 54. The hydrogen reacts with the iron ore and directly reduces the iron ore to metallic iron. The product iron is removed from direct reduction reactor 132 in stream 56 and purge gas from the reactor is generally combusted in a preheater and leaves as flue gas in stream 58.

Residual nitrogen is withdrawn from cryogenic rectification plant 126 in stream 43. The major portion 44 of stream 43 is passed through pressure swing adsorption unit 118 wherein it serves to regenerate adsorbent which has become loaded with carbon dioxide by desorbing the carbon dioxide from the adsorbent into the residual nitrogen stream. A minor portion 45 of stream 43 is passed through prepurifier 124 wherein it serves to regenerate adsorbent which has become loaded with water and carbon dioxide by desorbing the water from the adsorbent into the residual nitrogen stream. The resulting waste nitrogen streams 31 and 39 from units 118 and 124 respectively may be vented or, as illustrated in FIG. 1, may be passed into preferred oxidation reactor 136 wherein oxygen from stream 33 reacts with any remaining carbon monoxide to form carbon dioxide before the residual nitrogen stream is vented as stream 35.

It is an important aspect of this invention that the nitrogen which is used to regenerate the carbon dioxide removal system come from a cryogenic nitrogen-hydrogen separation and not from an air separation plant. Nitrogen from an air separation plant could potentially introduce oxygen into the carbon dioxide removal system and thus ultimately into the fortified blast furnace gas from which the hydrogen for the direct iron reduction reaction is taken. Such a presence of oxygen could prove hazardous, and the invention which uses two separate cryogenic rectification plants obviates any such potential hazard.

Figure 2:
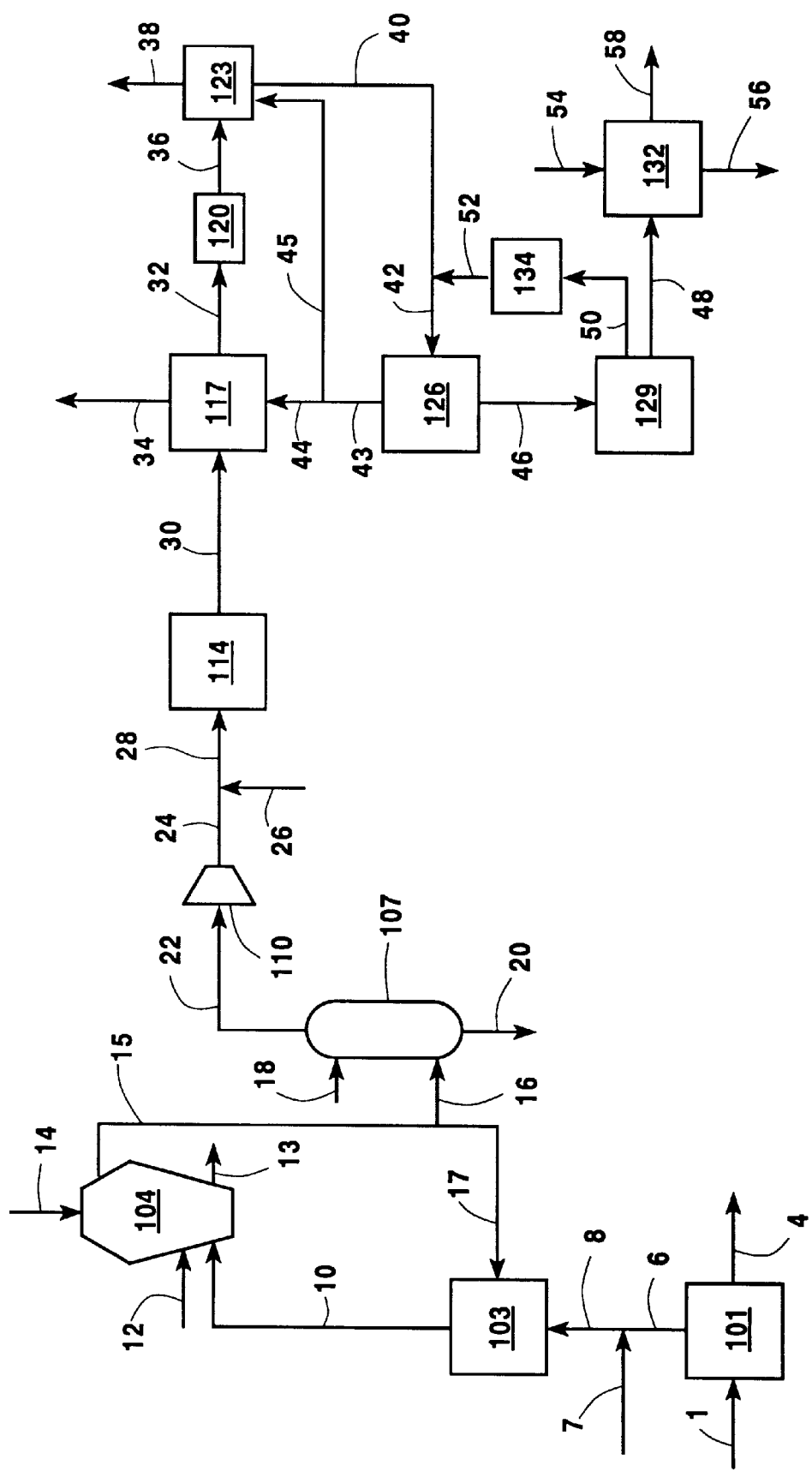
FIG. 2 is a simplified schematic block flow representation of another preferred embodiment of the method of this invention wherein carbon dioxide removal is carried out using a hot potassium carbonate system.

FIG. 2 illustrates another embodiment of the invention wherein the carbon dioxide removal system is a hot potassium carbonate system rather than a pressure swing adsorption system. The numerals in FIG. 2 are the same as those in FIG. 1 for the common elements and these common elements will not again be described in detail.

Referring now to FIG. 2, blast furnace gas stream 30 is passed from water gas shift reaction section 114 to acid gas removal system 117 which comprises an adsorber and stripper using hot potassium carbonate solution as a solvent. The solvent removes carbon dioxide from gas mixture 30 in an absorber tower. The solvent is regenerated in the stripper tower by using steam and residual nitrogen from stream 44 and the resulting mixture of carbon dioxide and residual nitrogen is vented as stream 34. Fortified blast furnace gas in stream 32 which may contain about 500 ppm of carbon dioxide is passed into methanation section 120 wherein the gas is preheated and then added to a methanator. Within the methanator all the residual carbon monoxide and carbon dioxide reacts with hydrogen to produce methane. The gas mixture from the methanation section 120 is passed in stream 36 to dryer 123 which removes water from the gas mixture and the resulting fortified blast furnace gas is withdrawn from dryer 123 in stream 40. Dryer 123 is regenerated by residual nitrogen stream 45 and the mixture of nitrogen and water is vented from dryer 123 in stream 38. Residual nitrogen in this embodiment contains hydrogen and methane as impurities.

Although the invention has been described in detail with reference to certain preferred embodiments, those skilled in the art will recognize that there are other embodiments of the invention within the spirit and the scope of the claims. For example, the cryogenic air separation plant need not be dedicated to the production of oxygen for the blast furnace but, rather, could produce oxygen for passage into a pipeline from which the oxygen could be passed not only to the blast furnace but also to other use points. The feed air into the cryogenic air separation plant could be obtained from a blast air blower designed to feed air to the blast furnace. The hydrogen concentration downstream of the cryogenic rectification plant could be by means of a pressure swing adsorption unit rather than by a membrane unit.

We claim:

1. A method for integrating a blast furnace and a direct reduction reactor using cryogenic rectification comprising:

(A) separating air in a cryogenic air separation plant by cryogenic rectification to produce oxygen;

(B) mixing oxygen from the cryogenic air separation plant with air to form blast air comprising from about 22 to 50 mole percent oxygen with the remainder comprised primarily of nitrogen;

(C) passing the blast air into a blast furnace and combusting oxygen of the blast air with hydrocarbon fuel in the blast furnace to produce blast furnace gas comprising nitrogen, carbon monoxide and hydrogen;

(D) reacting the carbon monoxide with steam to produce carbon dioxide and additional hydrogen, and removing the carbon dioxide from the blast furnace gas to produce fortified blast furnace gas comprising nitrogen and hydrogen;

(E) passing the fortified blast furnace gas into a cryogenic rectification plant and separating the fortified blast furnace gas within the cryogenic rectification plant to produce hydrogen and residual nitrogen; and (F) reacting hydrogen from the cryogenic rectification plant with iron ore in a direct reduction reactor to produce iron.

2. The method of claim 1 further comprising using a portion of the blast furnace gas from the blast furnace to heat the blast air prior to passing the blast air into the blast furnace.

3. The method of claim 1 further comprising passing the blast furnace gas in countercurrent upflow against downflowing water prior to the said reaction of steam with carbon monoxide.

4. The method of claim 1 wherein the removal of the carbon dioxide from the blast furnace gas is carried out by adsorbing carbon dioxide from the blast furnace gas onto adsorbent.

5. The method of claim 1 wherein the removal of the carbon dioxide from the blast furnace gas is carried out by absorbing carbon dioxide from the blast furnace gas into a potassium carbonate solution.

6. The method of claim 1 wherein the removal of the carbon dioxide from the blast furnace gas is carried out by passing carbon dioxide onto material, further comprising passing residual nitrogen in contact with the material and passing the carbon dioxide from the material into the residual nitrogen.

7. The method of claim 1 further comprising passing the hydrogen from the cryogenic rectification plant through a hydrogen concentrator to increase the hydrogen concentration of the hydrogen stream from the cryogenic rectification plant prior to passing it into the direct reduction reactor.

8. The method of claim 7 further comprising passing a recycle stream from the hydrogen concentrator into the cryogenic rectification plant.

9. The method of claim 7 wherein the hydrogen concentrator is a membrane unit.

10. The method of claim 7 wherein the hydrogen concentrator is a pressure swing adsorption unit.

* * * * *